(12) United States Patent
Linde et al.

(10) Patent No.: US 11,745,419 B2
(45) Date of Patent: Sep. 5, 2023

(54) SYSTEM AND A METHOD FOR PRODUCING A COMPONENT

(71) Applicant: Airbus Operations GmbH, Hamburg (DE)

(72) Inventors: Peter Linde, Hamburg (DE); Matthias Hegenbart, Hamburg (DE)

(73) Assignee: Airbus Operations GmbH

( * ) Notice: Subject to any disclaimer, the term of this patent is extended or adjusted under 35 U.S.C. 154(b) by 786 days.

(21) Appl. No.: 16/675,421

(22) Filed: Nov. 6, 2019

(65) Prior Publication Data

US 2020/0164573 A1 May 28, 2020

(30) Foreign Application Priority Data

Nov. 23, 2018 (DE) ...................... 10 2018 129 559.6

(51) Int. Cl.
| | |
|---|---|
| *B29C 64/188* | (2017.01) |
| *B29C 64/209* | (2017.01) |
| *B29C 64/393* | (2017.01) |
| *B33Y 30/00* | (2015.01) |
| *B33Y 50/02* | (2015.01) |
| *B33Y 10/00* | (2015.01) |

(52) U.S. Cl.
CPC .......... *B29C 64/188* (2017.08); *B29C 64/209* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/20; B29C 64/209; B29C 64/188; B29C 64/393; B33Y 10/00; B33Y 30/00; B33Y 50/02
See application file for complete search history.

(56) References Cited

U.S. PATENT DOCUMENTS

| | | | | |
|---|---|---|---|---|
| 2004/0164436 | A1* | 8/2004 | Khoshnevis | B29C 64/118 |
| | | | | 425/463 |
| 2015/0045928 | A1* | 2/2015 | Perez | B29C 64/118 |
| | | | | 700/110 |
| 2015/0174828 | A1* | 6/2015 | Creuzer | G01B 11/005 |
| | | | | 425/150 |
| 2016/0136897 | A1* | 5/2016 | Cole | B29C 64/194 |
| | | | | 425/150 |
| 2016/0236414 | A1* | 8/2016 | Reese | B33Y 50/02 |
| 2017/0129171 | A1* | 5/2017 | Gardner | B29C 64/118 |
| 2017/0173692 | A1* | 6/2017 | Myerberg | B33Y 30/00 |
| 2018/0311727 | A1* | 11/2018 | Willmann | B33Y 30/00 |
| 2019/0009472 | A1* | 1/2019 | Mark | B29C 64/393 |
| 2020/0368970 | A1* | 11/2020 | Georgeson | B33Y 30/00 |

FOREIGN PATENT DOCUMENTS

DE    102014220082 A1    4/2016

* cited by examiner

*Primary Examiner* — Jerzi H Moreno Hernandez
(74) *Attorney, Agent, or Firm* — Lerner David LLP

(57) ABSTRACT

A system is proposed, using which a material is dispensed in a web shape to additively produce a component. An in situ material check is performed, wherein if a geometric deviation lying outside a tolerance is established, material dispensing is interrupted to carry out finish compacting of a dispensed material web by way of a compacting unit.

12 Claims, 3 Drawing Sheets

SYSTEM AND A METHOD FOR PRODUCING A COMPONENT

FIELD OF THE INVENTION

The system relates to a system and a method for producing a component.

BACKGROUND OF THE INVENTION

Numerous different systems and methods exist for producing components. The following embodiments relate in particular to systems and methods for the additive and/or generative production of components.

Producing a component by successive web-shaped dispensing of material onto a substrate is known. For this purpose, a material dispensing unit is provided, which can dispense material in a metered manner onto a substrate. To achieve a desired component geometry, a relative movement is typically provided between the substrate and the material dispensing unit. Using a thermoplastic in particular for this purpose is known, which is supplied to the material dispensing unit as a filament and is heated therein to be dispensed onto the substrate.

It is to be observed that in such a procedure, the tensile strength of the component in the web direction, i.e., along the extension of the dispensed filaments, is higher than transversely thereto. It can often be established by component checking, which is executable destructively or by imaging methods, that sometimes air inclusions or incomplete adhesions can occur between the individual material webs.

BRIEF SUMMARY OF THE INVENTION

It would be desirable to be able to preclude such inconsistencies from the outset to obtain a component having defined mechanical properties. Aspects of the invention may propose a system and/or method for producing a component, using which precise additive production of a component can be implemented, which has reliable and reproducible desired mechanical properties.

A system for producing a component is proposed, the system comprising a material dispensing unit, a movement unit, a compacting unit, a material checking unit, and a control unit, wherein the material dispensing unit is designed to dispense a material supplied to the material dispensing unit in a metered manner and in a web shape on a substrate, wherein the movement unit is coupled to the material dispensing unit or the substrate and is designed to carry out a relative movement between the material dispensing unit and the substrate, so that the material is dispensed on a predetermined path, wherein the material checking unit is designed to examine the web-shaped dispensed material for geometric deviations from a desired shape during or immediately after the dispensing, and wherein the control unit is coupled to the material dispensing unit, the movement unit, and the material checking unit and is designed, upon detection of geometric deviations of the web-shaped dispensed material, to interrupt the dispensing of material by the material dispensing unit and, on an already traversed path, to push the dispensed material using the compacting unit into a desired web shape to remedy the deviations.

The material dispensing unit can be coupled to a material store, which provides the material to be dispensed. The material dispensing unit can have a conveying capacity for conveying the material from the material store to a dispensing opening. In addition, a heating device can be provided for heating and in particular for melting the supplied material. Depending on the material used, the material dispensing unit can also be constructed differently. In the following description, the material dispensing unit is provided to dispense the material in a metered and web-shaped manner onto a substrate, independently of the technology used. The heating can be carried out by an electrical resistance heating device and/or with the aid of radiation by visible or non-visible light or electromagnetic radiation in general. The type and embodiment of the heating device can be dependent on the material used, which comprises, in addition to all meltable and weldable plastics, also metallic or other weldable materials. It would be conceivable, for example, to dispense the material to be dispensed in the form of filaments, which are heated and melted by a laser.

As explained at the outset, the movement unit is provided to achieve a relative movement between the material dispensing unit and the substrate. The goal of the additive manufacturing of a component is the successive application of material in a desired form. A predetermined path can be followed by the relative movement, wherein this path is provided with material by single or multiple coating. The movement unit could in particular be designed to execute a three-dimensional relative movement. Thus, a movement can take place not only in one plane, but rather also perpendicularly to this plane. The movement unit does not necessarily have to be a single separate movement unit, but rather it could also be implemented as a combination of multiple movement devices. For example, a first movement device could be provided for generating a planar relative movement, while a second movement device carries out a movement perpendicularly thereto. The latter movement could be achieved, for example, by a vertically adjustable base.

One particular advantage of the system according to an embodiment of the invention is the use of a material checking unit, which examines the material web for geometric deviations during the dispensing or immediately after the dispensing of the material. The material checking unit is therefore provided for in situ material checking.

The technology of the material checking unit can, however, be selected in dependence on the material used. Numerous different sensors and methods exist for performing a material check. Using optical or acoustic devices can suggest itself. In the case of an optical device, an optical scanning of the material web could be performed to subsequently analyse the items of image information and derive inferences about possible flaws therefrom. However, this is more suitable for lateral, directly visible gaps between adjacent material webs. Flaws concealed by the material web would then remain undiscovered. Therefore, this type of the examination could be restricted more to a small number of types of material.

Using an ultrasonic measuring device could also suggest itself, which conducts an ultrasonic signal into the material web and adjacent regions and studies the sound waves radiated back into the ultrasonic measuring device. In this way, in particular boundary surfaces below the surface can be detected, which are to be attributed, for example, to air inclusions and directly reflect the ultrasound depending on the alignment of the boundary surface. Such a discrete, reflected signal could therefore be interpreted as an inclusion.

Furthermore, the material checking unit can be based on devices of diagnostic radiology and in particular can comprise a computer tomograph. Very well resolved items of image information can be provided thereby, which are also three-dimensional if needed. It can thus be immediately recognized whether a discontinuity exists due to a dispensed material web on the component to be produced.

The analysis of the items of information supplied by the material checking unit can be effectuated using the control unit or a computer unit connected thereto. The control unit is a device which is coupled to the above-mentioned main components. The control unit can therefore control the entire procedure of the production of the component. In addition to the activation of the material dispensing unit and the movement unit, the control unit can receive in situ items of information about the quality of the dispensed material web from the material checking unit, perform an analysis immediately in the meantime, and thereupon influence the procedure of the production of the component.

The control unit is therefore capable of checking a material web and/or a presently processed region of the component for geometric deviations. A completely flawless execution is not absolutely necessary and is possibly also not implementable. The control unit should therefore be designed to execute the examination in consideration of a certain error tolerance. If discontinuities are detected, they could be expressed by a defined numeric value in dependence on the size of the discontinuity, which is compared to a predetermined tolerance. If this tolerance is then exceeded, the control unit can effectuate the stopping of the construction and effectuate postprocessing of the dispensed material.

The compacting unit can represent a unit which can be brought into contact with the dispensed material. By exerting a mechanical pressure in the direction of the substrate or in the direction of prior webs, with which the present web has to be connected, the material web inducing a discontinuity can be brought into shape. The particular advantage is that the material checking unit can already establish during the postprocessing or immediately thereafter whether the previously detected discontinuity has already been sufficiently remedied.

In summary, the system according to an embodiment of the invention is capable of producing a component which reliably and reproducibly has previously determined mechanical properties, since even ultra small inconsistencies can be detected and remedied if necessary immediately during the production procedure.

In one advantageous embodiment, the compacting unit is designed to press the dispensed material continuously onto the substrate immediately after the dispensing. The probability that a flaw will occur during the application of material can thus already be reduced.

The compacting unit is preferably designed to be warmed at least at a contact point with the dispensed material to remedy the deviations. During the dispensing of plastic, in this way, for example, local melting or softening of the material could be achieved. After the pressing on, the material can adhere accordingly to the prior material webs or to the substrate, respectively. The warming or heating can also be carried out in general at this point by an electrical resistance heating device and/or with the aid of radiation by visible or non-visible light or electromagnetic radiation. The type and embodiment of the heating device can be dependent on the material used.

In one advantageous embodiment, the compacting unit is embodied as a carriage, which comprises a flat contact side, which can be pressed onto the dispensed material. Such a carriage can be coupled in a simple manner, for example, to the material dispensing unit, so that during a relative movement carried out between the substrate and the material dispensing unit, the carriage is always placed at the same location in relation to the material dispensing unit. A carriage can additionally be displaced very easily on a dispensed material, which can also be improved, for example, by a curved tip or front edge. The compacting unit can in this manner already compact material on the substrate during the procedure of dispensing thereof and therefore improve the adhesion already at the beginning.

The carriage preferably has a width which exceeds the width of a dispensed material web. The dispensed material web is therefore not only pressed locally and separately in the direction of the substrate, but rather the carriage can overlap a seam to at least one adjacent material web, so that in this way extensive equalizing of material web heights is carried out. The material is then generally speaking pushed more toward the adjacent material web at least at the seam.

The at least one contact pressure surface could comprise a lateral contact pressure surface, which is parallel to a processing direction and perpendicular to the substrate, and which is arranged on the contact side. The lateral, perpendicularly extending contact pressure surface permits the delimitation of a possible elongation movement of the web-shaped dispensed material. The lateral contact pressure surface can in particular delimit a free lateral side of the just dispensed material web. Therefore, guiding the at least one contact pressure surface in the movement sequence behind the material dispensing device suggests itself, so that immediately after the application of the material, it is kept in shape by the at least one contact pressure surface.

The compacting unit can comprise a cut-out protruding through the at least one contact pressure surface, wherein the material checking unit is mounted in relation to the compacting unit in such a way that the material checking unit examines a dispensed material web through the cut-out. Therefore, immediately after the material is pressed onto the substrate, its geometric properties can be examined The cut-out is to be positioned so that pressing on of the dispensed material is possible and the examination can take place as much as possible immediately after the depositing and the pressing on of the material.

In one particularly advantageous embodiment, the system furthermore comprises a protective gas dispensing unit for the controlled generation of a protective gas atmosphere in a material dispensing region. This can be advantageous in particular upon the use of an extrusion device and a plastic material in filament form. The plastic material exiting from the extrusion device then enters a protective gas atmosphere, which improves an adhesion of the individual material webs and can therefore significantly improve the mechanical properties. The protective gas could be nitrogen or argon, for example.

The compacting unit, the material checking unit, and the material dispensing unit are particularly preferably mounted jointly or at least partially one on another. The construction of the system is facilitated and the three main components are coherent geometrically and/or in the position thereof.

The compacting unit, the material checking unit, and the material dispensing unit are preferably coupled jointly to the movement unit. The three components can thus be moved over the substrate using the movement unit. Providing a common mounting frame, which is coupled to the movement unit, suggests itself for this purpose.

The movement unit could in particular comprise a robot arm. Three-dimensional guiding of at least the material dispensing unit can thus be performed. Furthermore, the possibility is also provided of providing more than only three degrees of freedom, but rather also four, five, or six degrees of freedom, which result by rotation around one, two, or three spatial axes. More complex, three-dimensionally curved, planar components can thus also be produced, in which the individual material webs extend curved in space. This could be possible, for example, upon the use of a curved substrate.

The material dispensing unit could be designed to melt and dispense filaments made of plastic. For this purpose, the material dispensing unit can comprise an extrusion device, through which the heated plastic material exits, wherein the dispensed material web has a precise cross section predetermined by the extrusion device.

The material checking unit particularly preferably comprises an x-ray device. Concealed geometric deviations can thus also be detected easily.

The invention furthermore relates to a method for producing a component. The method comprises the steps of executing a relative movement between a material dispensing unit and a substrate by means of a movement unit, which is coupled to the material dispensing unit or the substrate, the metered web-shaped dispensing of a material supplied to the material dispensing unit on the substrate on a predetermined path by means of the material dispensing unit, examining the web-shaped dispensed material for geometric deviations from a desired shape by means of a material checking unit during or immediately after the dispensing, and upon detection of geometric deviations of the web-shaped dispensed material, interrupting the dispensing of material and remedying the deviations on an already traversed web by pushing the dispensed material using a compacting unit into a desired web shape.

BRIEF DESCRIPTION OF THE DRAWINGS

Further features, advantages, and possible applications of the present invention result from the following description of the exemplary embodiments and the figures. In this case, all features which are described and/or illustrated form the subject matter of the invention as such and in any arbitrary combination, even independently of the combination thereof in the individual claims or the references thereof. In the figures, identical reference signs furthermore stand for identical or similar objects.

DETAILED DESCRIPTION

Figure 1:
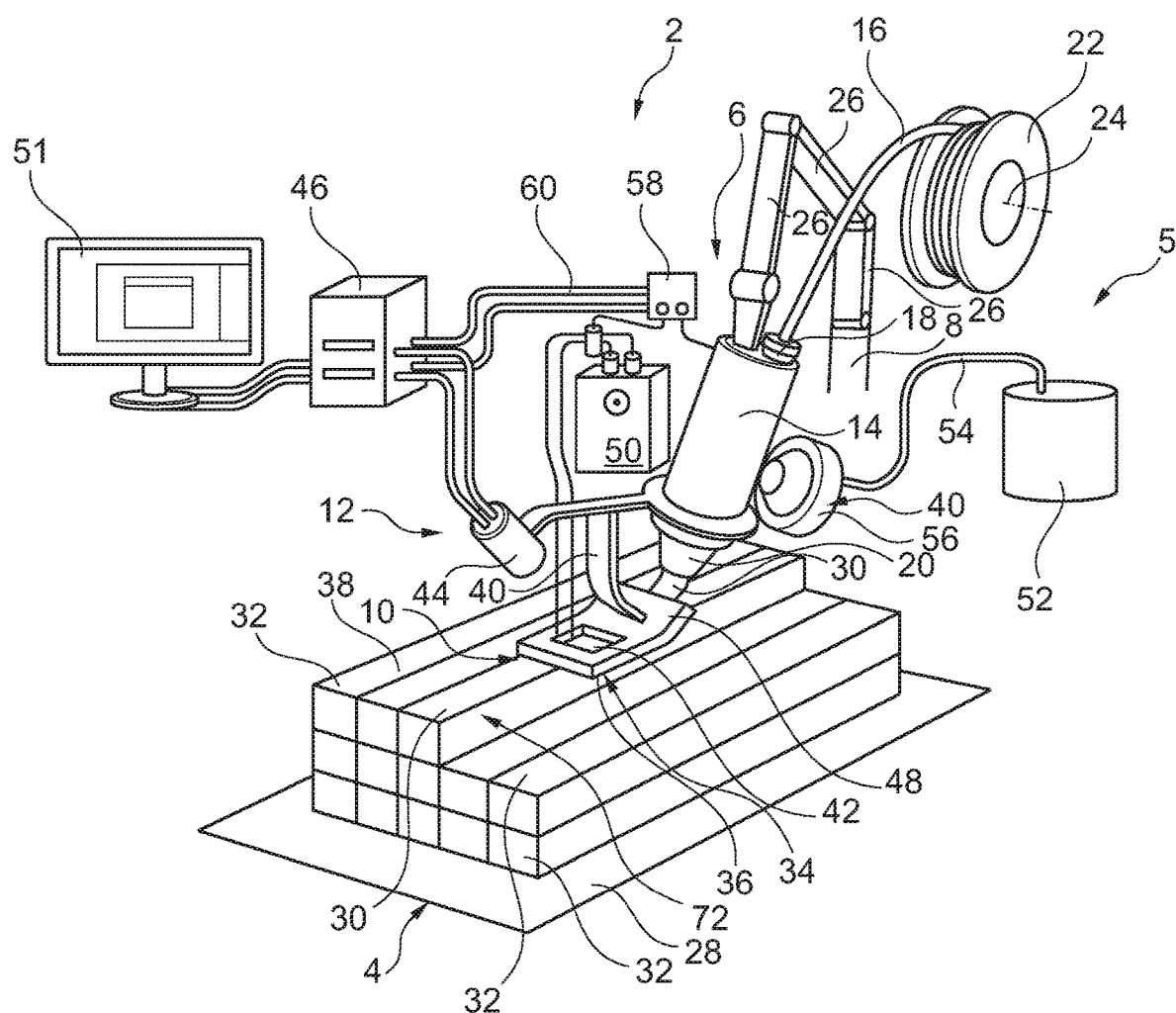
FIG. 1 shows a system according to the invention in a three-dimensional view.

FIG. 1 shows a system 2 for producing a component 4 in a schematic, three-dimensional view. The system 2 comprises a material dispensing unit 6, a movement unit 8, a compacting unit 10, and a material checking unit 12. In the illustrated case, the material dispensing unit 6 comprises a heating device 14, to which a plastic in the form of a filament 16 can be applied via a material intake 18. In the heating device 14, the filament 16 is heated and melted for this purpose. The molten material is subsequently dispensed to the outside through an extrusion nozzle 20 as an extrusion device.

The filament 16 is kept ready on a coil 22. The material dispensing unit 6 can comprise a corresponding conveyor device for conveying the filament 16. The coil 22 can be rotatably mounted around an axis 24. It is not necessary for the coil 22 to be located in the immediate vicinity of the material dispensing unit 6, as long as an interference-free supply of the filament 16 to the material dispensing unit 6 is possible.

The movement unit 8 is embodied in this exemplary embodiment as a robot arm. It comprises multiple arm elements 26, which are movable in relation to one another. The movement unit 8 is particularly preferably designed to carry out a complete three-dimensional movement. The material dispensing unit 6 can therefore be moved to arbitrary three-dimensional positions in space, in dependence on the mechanical action radius of the movement unit 8. It is provided by way of example here that the movement unit 8 is directly connected to the material dispensing unit 6.

The component 4 is formed on a substrate 28 or a base 28 by web-shaped dispensing of the material 16. FIG. 1 shows how material leaves the extrusion nozzle 20 and is added as a material web 30 to already existing material webs 32. By moving the material dispensing unit 6, material webs 30 can therefore be dispensed adjacent to one another and one on top of another to successively form the component 4.

The compacting unit 10 is embodied by way of example as a carriage, which has a flat contact side 34. A first contact pressure surface 36 is provided thereon. The first contact pressure surface 36 is pressed onto the just dispensed material web 30 and guided after the material dispensing unit 6. A flush application of the material web 30 in relation to the already existing material webs 32 can thus be assisted. In the example shown, the compacting unit 10 has a width b which exceeds the width of the material web 30. A seam 38 can thus be overlapped, so that finally the just dispensed material web 30 is aligned vertically flush with the adjacent material webs 32.

The compacting unit 10 is arranged on a mounting frame 40, which is connected to the material dispensing unit 6. The compacting unit 10 thus always follows the movement of the material dispensing unit 6. In addition, the material checking unit 12, which checks the just dispensed material web 30 for possible geometric deviations from a desired path, is arranged on the mounting frame 40. For this purpose, the compacting unit 10 comprises a cut-out 42, which protrudes through the first contact pressure surface 36. The material checking unit 12 is aligned in such a way that a check can be carried out through the cut-out 42. A viewing axis from the material checking unit 12 is therefore to be oriented undisturbed by the cut-out 42 on the material web 30 being dispensed.

In the example shown, the material checking unit 12 comprises an x-ray source 44, which emits a bundled or fanned-out x-ray in the direction of the cut-out 42. The base 28 could be equipped with a detector, by which the x-rays passing through the component 4 are detectable. By arranging the material checking unit 12 at a fixed distance in relation to the material dispensing unit 6, the dispensed material web 30 is always checked in situ for possible flaws or geometric deviations.

A control unit 46 is connected to the material checking unit 12 and the material dispensing unit 6 and the movement unit 8. The control unit 46 can control the procedure of the production of the component 4 in that the movement unit 8 is activated to carry out a movement of the material dispensing unit 6 along predetermined paths and simultaneously to check the dispensed material web 30. The material checking unit 12 supplies data for this purpose to the control unit 46, which represent the state of the material web 30. The control unit 46 can be designed for the purpose of receiving raw data, interpreting them independently on the basis of an algorithm, and comparing them in the scope of a predetermined, adjustable tolerance to predetermined geometric properties or state variables. The control unit 46 could also be connected to a further unit (not shown here), however, which generates comparable state data from the raw data of the material checking unit 12. This unit could also be integrated into the material checking unit 12.

If the control unit 46 should detect a geometric deviation outside the set tolerance, the control unit 46 can be designed to interrupt the dispensing procedure by the material dispensing unit 6. The movement unit 8 could then be activated so that an opposing movement is performed and the compacting unit 10 could push the dispensed material web 30 into its desired shape. For this purpose, the compacting unit 10 is provided with a heating device 48, which is supplied with electrical voltage via a power supply 50, such as a current source. The heating device 48 is also coupled to the control unit 46 to be activated or deactivated as needed. Local softening of the dispensed material web 30 can take place due to heating of the first contact pressure surface 36 and the material can be pressed into shape by moving the compacting unit 10. The success of this procedure can be checked simultaneously by the material checking unit 12. The control unit 46 is preferably designed so that this finish compacting is carried out until the established geometric deviations disappear or are within the tolerance. A user can monitor the entire procedure via a monitoring unit 51, which is shown here on the basis of a monitor.

FIG. 1 furthermore shows a protective gas dispensing unit 53 having a protective gas storage tank 52, which dispenses a protective gas into a nozzle 56 via a gas line 54 and at the same time forms a protective gas atmosphere around the extrusion device 20. The adhesion of the molten plastic material on already dispensed material webs 32 can thus be improved. Alternatively, instead of a protective gas storage tank 52, a gas storage tank 52 which contains a combustible gas can also be provided. This could be supplied to the material dispensing unit 6 to heat the filament 16.

A switching unit 58, which is coupled via lines 60 to the control unit 46, is shown solely by way of example. Using this, the control unit 46 is capable of performing switching procedures to the material dispensing unit 6 and the heating device 48 so that the dispensing of material and the heating of the compacting unit 10 can be activated or deactivated as needed.

Figure 2A:
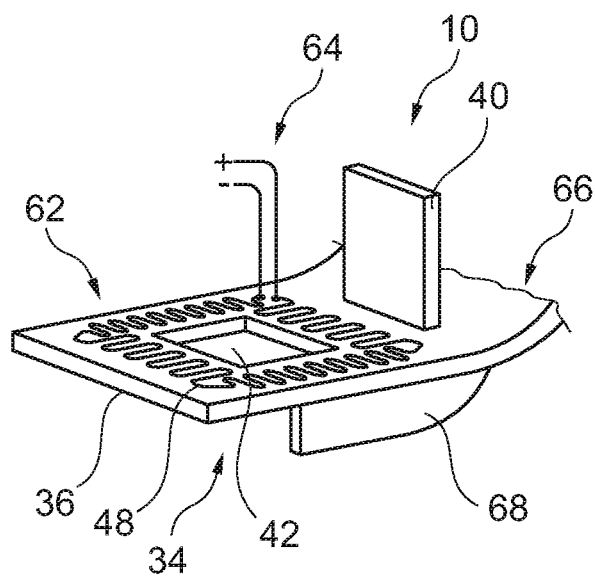
FIGS. 2a and 2b show details of a compacting unit.
Figure 2B:
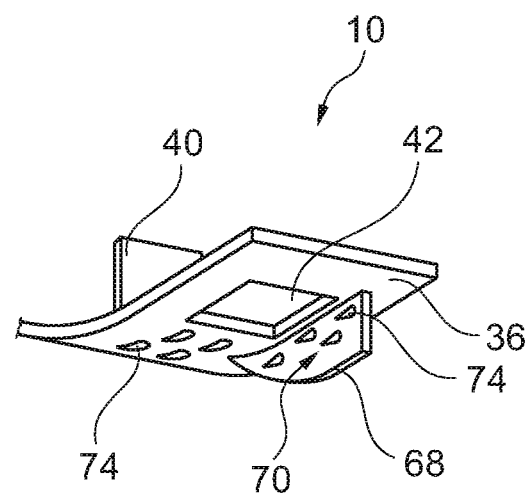

FIGS. 2a and 2b show the compacting unit 10 in somewhat more detailed illustrations. The heating device 48 can be seen as meandering heating spirals on an upper side 62. These are supplied with electrical voltage as needed via a supply line 64. A front side 66 oriented toward the material dispensing unit 6 has a slight curvature, so that the compacting unit 10 can slide easily on the dispensed material web 32. Moreover, the front side 66 is prevented from tilting with the dispensed material web 32. The cut-out 42, which is enclosed completely by the heating device 48, is located behind the mounting frame 40.

A stud 68, which is aligned perpendicularly to the first contact pressure surface 36 and comprises a second contact pressure surface 70, extends on the contact side 34. This stud is aligned laterally and can slide along a lateral delimitation 72 (see FIG. 1) of the just dispensed material web 30.

The first contact pressure surface 36 and the second contact pressure surface 70 are each equipped with friction devices 74, which push the material of the dispensed material web 30 in reverse along the filament extension during a movement of the compacting unit 10 in a reverse direction due to a somewhat strengthened friction, so that a certain finish contacting is thus also achieved. The friction devices 74 can be embodied as points having elevated roughness or as edges oriented in the reverse direction.

Figure 3A:
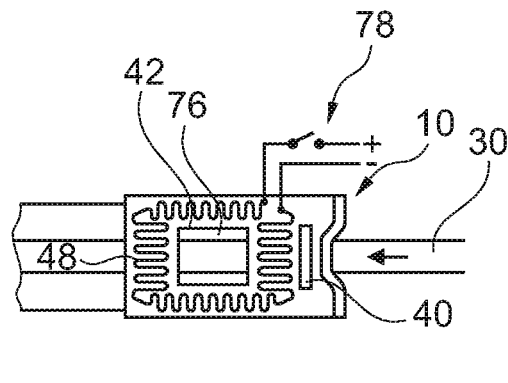
FIGS. 3a and 3b respectively show the procedure of dispensing and finish compacting in a top view and a side view in each case of the compacting unit.
Figure 3A:
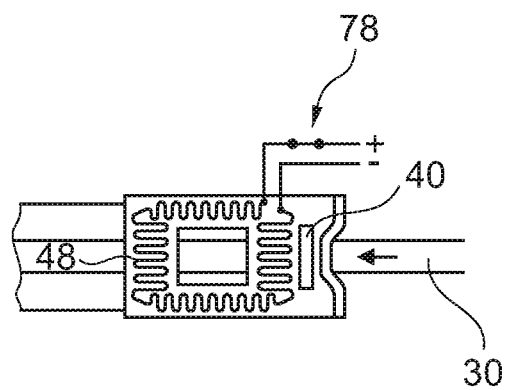
Figure 3A:
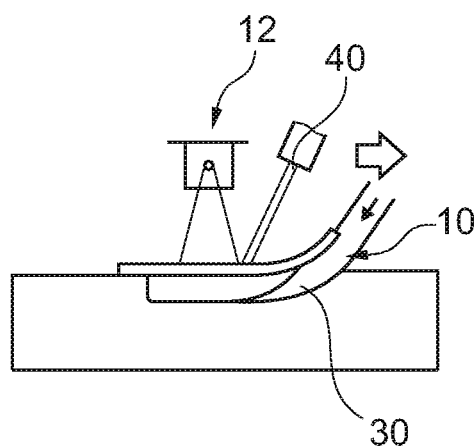
Figure 3B:
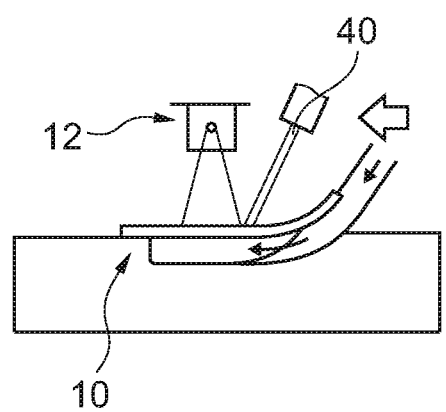

In FIGS. 3a and 3b, respectively the dispensing (FIG. 3a) and the finish compacting (FIG. 3b) are each shown in the two views (top view and side view). FIG. 3a shows the compacting unit 10 in a top view, wherein it can be established through the cut-out 42 that a deviation 76 is present in the form of a flaw, i.e., in particular an incomplete adhesion. This can be recognized by the material checking unit 12 immediately after the application of the material web 30. As indicated, a switch 78 for activating the heating device 48 is open, i.e., the compacting unit 10 only travels directly over the just dispensed material 30 during the dispensing of the material and permits the checking of the material web 30 through the cut-out 42.

Due to establishing the geometric deviation, which is outside a tolerance, for example, the switch 78 is closed, so that the heating device 48 is activated. This is shown in FIG. 3b. The compacting unit 10 is then moved in the opposite direction, so that finish compacting is carried out. This is also checked in situ by the material checking unit 12. If the finish compacting has proceeded so that all geometric deviations are remedied, the dispensing of the material web 30 can be continued.

Figure 4:
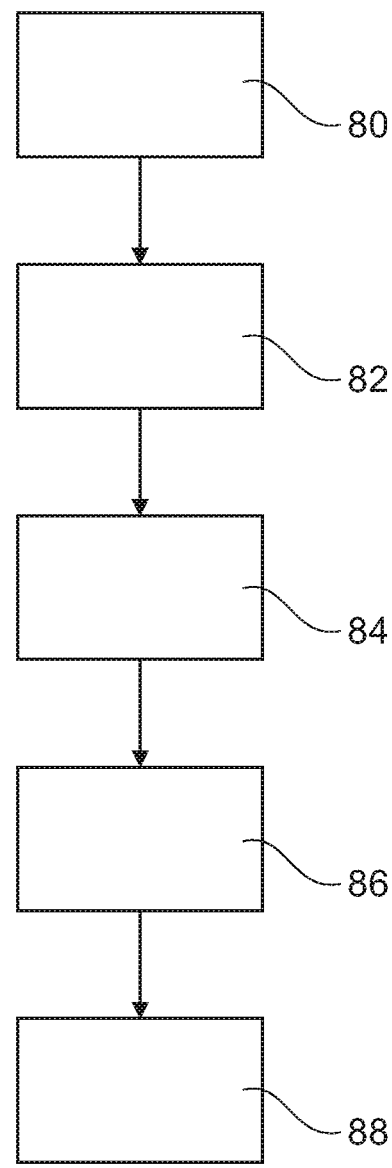
FIG. 4 shows the method according to the invention in a schematic block diagram.

FIG. 4 shows a block diagram to illustrate the method. The method comprises the steps of executing 80 a relative movement between the material dispensing unit 6 and the substrate 28 by means of the movement unit 8, which is coupled to the material dispensing unit 8 or the substrate 28. Simultaneously, a material supplied to the material dispensing unit 6 is dispensed 82 in a metered manner and in a web shape on the substrate 28 on a predetermined path by means of the material dispensing unit 6. During or immediately after the dispensing 82, the web-shaped dispensed material is checked 84 for geometric deviations from a desired shape by means of the material checking unit 12. If geometric deviations of the web-shaped dispensed material are detected, the dispensing of material is interrupted 86 and the deviations on an already traversed path are remedied 88 by pushing the dispensed material using the compacting unit 10 into a desired web shape.

In addition, it is to be noted that "comprising" does not exclude other elements or steps and "a" or "one" does not exclude a plurality. Furthermore, it is to be noted that features which have been described with reference to one of the above exemplary embodiments can also be used in combination with other features of other above-described exemplary embodiments. Reference signs in the claims are not to be considered to be a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 system
4 component
6 material dispensing unit
8 movement unit/robot arm
10 compacting unit
12 material checking unit
14 heating device
16 filament/material
18 material intake
20 extrusion device/extrusion nozzle
22 coil
24 axis
26 arm element
28 substrate/base
30 material web (being dispensed)
32 material web (existing)
34 contact side
36 first contact pressure surface
38 seam
40 mounting frame
42 cut-out
44 x-ray source
46 control unit
48 heating device
50 power supply
51 monitoring unit
52 protective gas storage tank
53 protective gas dispensing unit
54 gas line
56 nozzle
58 switching unit
60 line
62 upper side
64 supply line
66 front side
68 stud
70 second contact pressure surface
72 lateral delimitation
74 friction device
76 deviation
78 switch
80 moving
82 dispensing
84 checking/examining
86 interrupting
88 remedying

The invention claimed is:

1. A system for producing a component, comprising:
a material dispensing unit;
a movement unit;
a compacting unit having at least one contact pressure surface;
a material checking unit; and
a control unit,
wherein the material dispensing unit is configured to dispense a material supplied to the material dispensing unit in a metered manner and in a web shape on a substrate,
wherein the movement unit is coupled to the material dispensing unit or the substrate and is configured to carry out a relative movement between the material dispensing unit and the substrate, so that the material is dispensed on a predetermined path,
wherein the material checking unit is configured to examine the web-shaped dispensed material for geometric deviations from a desired shape during or immediately after the dispensing,
wherein the control unit is coupled to the material dispensing unit, the movement unit, and the material checking unit and is configured, upon detection of geometric deviations of the web-shaped dispensed material, to interrupt the dispensing of material by the material dispensing unit and, on an already traversed path, to push the dispensed material using the compacting unit into a desired web shape to remedy the deviations,
wherein the compacting unit comprises a cut-out protruding through the at least one contact pressure surface, and
wherein the material checking unit is mounted in relation to the compacting unit in such a way that the material checking unit examines a dispensed material web through the cut-out.

2. The system according to claim 1, wherein the compacting unit is configured to press the dispensed material continuously onto the substrate immediately after the dispensing.

3. The system according to claim 1, wherein the compacting unit is configured to be warmed at least at a contact point with the dispensed material to remedy the deviations.

4. The system according to claim 1, wherein the compacting unit is embodied as a carriage having a flat contact side comprising the at least one contact pressure surface configured to be pressed onto the dispensed material.

5. The system according to claim 4, wherein the compacting unit has a width exceeding a width of a dispensed material web.

6. The system according to claim 4, wherein the at least one contact pressure surface comprises a lateral contact pressure surface parallel to a processing direction and perpendicular to the substrate, and arranged on the contact side.

7. The system according to claim 1,
further comprising a protective gas dispensing unit for the controlled generation of a protective gas atmosphere in a material dispensing region.

8. The system according to claim 1,
wherein the compacting unit, the material checking unit, and the material dispensing unit are jointly or at least partially mounted on one another.

9. The system according to claim 8, wherein the compacting unit, the material checking unit, and the material dispensing unit are jointly coupled to the movement unit.

10. The system according to claim 1, wherein the movement unit comprises a robot arm.

11. The system according to claim 1, wherein the material dispensing unit is configured to melt and dispense filaments made of plastic.

12. The system according to claim 1, wherein the material checking unit comprises an x-ray device.

* * * * *